United States Patent
Klasen-Memmer et al.

(10) Patent No.: US 7,026,022 B2
(45) Date of Patent: *Apr. 11, 2006

(54) LIQUID-CRYSTALLINE MEDIUM

(75) Inventors: Melanie Klasen-Memmer, Heuchelheim (DE); Dagmar Klement, Gross-Zimmern (DE); Matthias Bremer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/035,069

(22) Filed: Jan. 14, 2005

(65) Prior Publication Data

US 2005/0121647 A1    Jun. 9, 2005

Related U.S. Application Data

(62) Division of application No. 10/479,059, filed as application No. PCT/EP02/04704 on Apr. 29, 2002, now Pat. No. 6,933,022.

(30) Foreign Application Priority Data

Jun. 1, 2001   (DE)   ................. 101 26 768

(51) Int. Cl.
  *C09K 19/30*   (2006.01)
  *C09K 19/12*   (2006.01)
  *C09K 19/20*   (2006.01)
(52) U.S. Cl. ............. 428/1.1; 252/299.63; 252/299.66; 252/299.67
(58) Field of Classification Search ................. 428/1.1; 252/299.63, 299.66, 299.67
See application file for complete search history.

(56) References Cited

U.S. PATENT DOCUMENTS

| | | | |
|---|---|---|---|
| 5,384,065 A | 1/1995 | Geelhaar et al. | |
| 5,599,480 A | 2/1997 | Tarumi et al. | |
| 6,066,268 A | 5/2000 | Ichinose et al. | |
| 6,217,953 B1 | 4/2001 | Heckmeier et al. | |
| 6,248,410 B1 | 6/2001 | Ichinose et al. | |
| 6,764,722 B1 * | 7/2004 | Klasen et al. ................. | 428/1.1 |
| 6,764,723 B1 * | 7/2004 | Lee et al. ..................... | 428/1.1 |
| 2001/0010366 A1 | 8/2001 | Heckmeiar et al. | |
| 2002/0014613 A1 | 2/2002 | Klasen et al. | |

FOREIGN PATENT DOCUMENTS

| | | |
|---|---|---|
| DE | 19607043 | 8/1997 |
| DE | 19803112 | 9/1998 |
| DE | 19927627 | 1/2000 |
| DE | 10112955 | 11/2001 |
| EP | 0474062 | 3/1992 |
| EP | 0969071 | 1/2000 |
| EP | 1106671 | 6/2001 |
| WO | WO 8908633 | 9/1989 |

* cited by examiner

*Primary Examiner*—Shean C. Wu
(74) *Attorney, Agent, or Firm*—Millen, White, Zelano, Branigan, P.C.

(57) ABSTRACT

The invention relates to a liquid crystalline medium characterized by containing one or more compounds of general formula (I) and one or more compounds of formula (II), wherein $R^1$, $R^2$, $R^3$, $R^4$ and c have the meanings as cited in Claim No. 1.

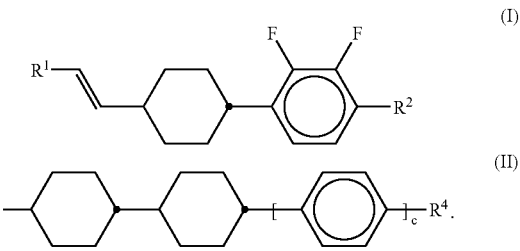

22 Claims, No Drawings

LIQUID-CRYSTALLINE MEDIUM

This application is a divisional of U.S. Ser. No. 10/479,059, filed Nov. 26, 2003 now U.S. Pat. No. 6,933,022; U.S. Ser. No. 10/479,059 is a 371 National stage application of PCT/EP02/04704, filed Apr. 29, 2002.

The present invention relates to a liquid-crystalline medium, in particular a liquid-crystalline medium based on a mixture of compounds of negative dielectric anisotropy, to the use thereof as for electro-optical purposes, and to displays containing this medium, in particular displays based on the DAP (deformation of aligned phases), ECB (electrically controlled birefringence), CSH (colour super homeotropic), VA (vertically aligned) or IPS (in plane switching) effect.

The principle of electrically controlled birefringence, the ECB effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio of the elastic constants $K_{33}/K_{11}$, high values for the optical anisotropy $\Delta n$, and values for the dielectric (DC) anisotropy $\Delta\epsilon$ of from about −0.5 to about −5 in order to be suitable for high-information display elements based on the ECB effect. Electro-optical display elements based on the ECB effect have, in the switched-off state, a homeotropic or vertical edge alignment, i.e. an alignment substantially perpendicular to the electrode surfaces.

More recent types of ECB display having a homeotropic edge alignment are those based on the CSH or VA (vertically aligned) effect, where the latter is also known under the terms VAN (vertically aligned nematic) and VAC (vertically aligned cholesteric) effect. CSH displays are known, inter alia, from H. Hirai, Japan Displays 89 Digest, 184 (1989), J. F. Clerc et al., Japan Displays 89 Digest, 188 (1989) and J. F. Clerc, SID 91 Digest, 758 (1991). VAN displays have been described, inter alia, in S. Yamauchi et al., SID Digest of Technical Papers, pp. 378 ff (1989), and VAC displays have been described in K. A. Crabdall et al., Appl. Phys. Lett. 65, 4 (1994).

The more recent VA displays, like the ECB displays already disclosed earlier, contain a layer of a liquid-crystalline medium between two transparent electrodes, the liquid-crystal medium having a negative value for the DC anisotropy $\Delta\epsilon$. The molecules of this liquid-crystal layer have a homeotropic or tilted homeotropic alignment in the switched-off state. Owing to the negative DC anisotropy, realignment of the liquid-crystal molecular parallel to the electrode surfaces takes place in the switched-on state.

In contrast to conventional ECB displays, in which the liquid-crystal molecules have, in the switched-on state, a parallel alignment with a preferential direction which is uniform over the entire liquid-crystal cell, in VAN and VAC displays this uniform parallel alignment is usually restricted only to small domains within the cell. Disclinations exist between these domains, also known as tilt domains.

As a consequence of this, VA displays have greater viewing-angle independence of the contrast and of the grey shades compared with conventional ECB displays. In addition, displays of this type are simpler to produce since additional treatment of the electrode surface for uniform alignment of the molecules in the switched-on state, such as, for example, by rubbing, is no longer necessary.

In contrast to VAN displays, the liquid-crystal media in VAC displays additionally comprise one or more chiral compounds, such as, for example, chiral dopants, which, in the switched-on state, induce a helical twist of the liquid-molecules in the liquid-crystal layer by an angle of between 0 and 360°. The twist angle in the preferred case is about 90°.

For displays having a vertical edge alignment, the use of compensators, such as, for example, optically uniaxially negative compensation films, has also been proposed in order to compensate for undesired light transmission of the display in the switched-off state at an inclined viewing angle.

In addition, it is possible by means of a special design of the electrodes to control the preferential direction of the tilt angle without additional surface treatment of the electrodes, such as, for example, by an alignment layer, being necessary. A CSH display of this type is described, for example, in Yamamoto et al., SID 91 Digest, 762 (1991).

In IPS displays, the electrical signals are generated in such a way that the electric fields have a significant component parallel to the liquid-crystal layer (in-plane switching). International Patent Application WO 91/10936 discloses a liquid-crystal display of this type. The principles of operating a display of this type are described, for example, by R. A. Soref in Journal of Applied Physics, Vol. 45, No. 12, pp. 5466–5468 (1974). EP 0 588 568 discloses various ways of addressing a display of this type.

These IPS displays can be operated with liquid-crystalline materials having either positive or negative dielectric anisotropy ($\Delta\epsilon\neq0$). With the materials known hitherto, however, relatively high threshold voltages and long response times are achieved in IPS displays. In addition, the problem of crystallisation of the liquid-crystal medium at low temperatures may occur in IPS displays containing materials known hitherto.

A further, highly promising type of liquid-crystal display are the so-called "axially symmetric microdomain" (ASM for short) displays, which are preferably addressed by means of plasma arrays (PA LCDs, from "plasma-addressed liquid-crystal displays").

The displays described above can be of the active matrix or passive matrix (multiplex) type. Thus, for example, ECB and VA displays which are operated as active matrix or multiplex displays have been described, whereas CSH displays are usually operated as multiplex displays.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.

2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is generally arranged in such a way that a filter element is opposite each switchable pixel. TFT are usually lit from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984:

A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important for displays that have to have acceptable resistance values over a long operating period.

It is furthermore important that the specific resistance exhibits the smallest possible decrease with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

Industrial use of the effects described above in electro-optical display elements requires LC phases which have to meet a multiplicity of requirements. Particularly important here are the chemical resistance to moisture, air and physical influences, such as heat, radiation in the infrared, visible and ultraviolet region, as well as direct and alternating electric fields.

LC phases that can be used in industry are furthermore required to have a liquid-crystalline mesophase in a suitable temperature range and low viscosity.

None of the series of compounds having a liquid-crystalline mesophase that have been disclosed hitherto includes an individual compound which meets all these requirements. In general, therefore, mixtures of from 2 to 25, preferably from 3 to 18, compounds are prepared in order to obtain substances that can be used as LC phases. However, it has not been possible to prepare optimum phases easily in this way, since liquid-crystal materials of significantly negative dielectric anisotropy were hitherto not available to an adequate extent.

EP 0 474 062 discloses MLC displays based on the ECB effect. The LC mixtures described therein are based on 2.3-difluorophenyl derivatives which contain an ester, ether or ethyl bridge, but have low values for the voltage holding ratio (HR) after exposure to UV. They are therefore of low suitability for use in the displays described above.

There thus continues to be a great demand for MLC displays, in particular of the ECB, VA, CSH, IPS, ASM and PALC types, having very high specific resistance at the same time as a large working-temperature range, short response times even at low temperatures, and low threshold voltage which facilitate a multiplicity of grey shades, high contrast and broad viewing angles and which do not exhibit the disadvantages described above, or only do so to a small extent.

The invention had the object of providing MLC displays which do not have the disadvantages indicated above or only do so to a small extent, and preferably at the same time have very high specific resistance values and low threshold voltages.

It has now been found that this object can be achieved if media according to the invention are used in LC displays.

The invention thus relates to a liquid-crystalline medium, characterised in that it comprises one or more compounds of the formula I

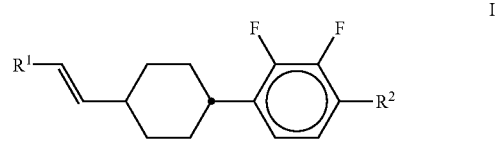

and one or more compounds of the formula II

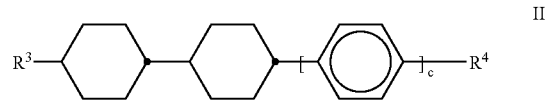

in which
$R^1$ is H or alkyl having from 1 to 5 carbon atoms,
$R^2$ is alkoxy having from 1 to 12 carbon atoms,
$R^3$ is alkenyl having from 2 to 7 carbon atoms,
$R^4$ is alkyl having from 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, and
c is 0 or 1.

The invention furthermore relates to a liquid-crystalline medium based on a mixture of polar compounds of negative dielectric anisotropy, characterised in that it comprises one or more compounds of the formula I and one or more compounds of the formula II.

The invention furthermore relates to an electro-optical display having active-matrix addressing, in particular a display based on the DAP, ECB, VA, CSH, IPS, ASM or PALC effect, characterised in that it contains, as dielectric, a liquid-crystalline medium according to claim 1.

In the compounds of the formula I, $R^1$ is preferably H or straight-chain alkyl having from 1 to 4 carbon atoms, in particular H, methyl, ethyl or n-propyl, very particularly preferably H or methyl. $R^2$ is preferably straight-chain alkoxy having from 1 to 6 carbon atoms, in particular methoxy, ethoxy, n-propoxy or n-butoxy.

The compounds of the formula II are preferably selected from the following formulae:

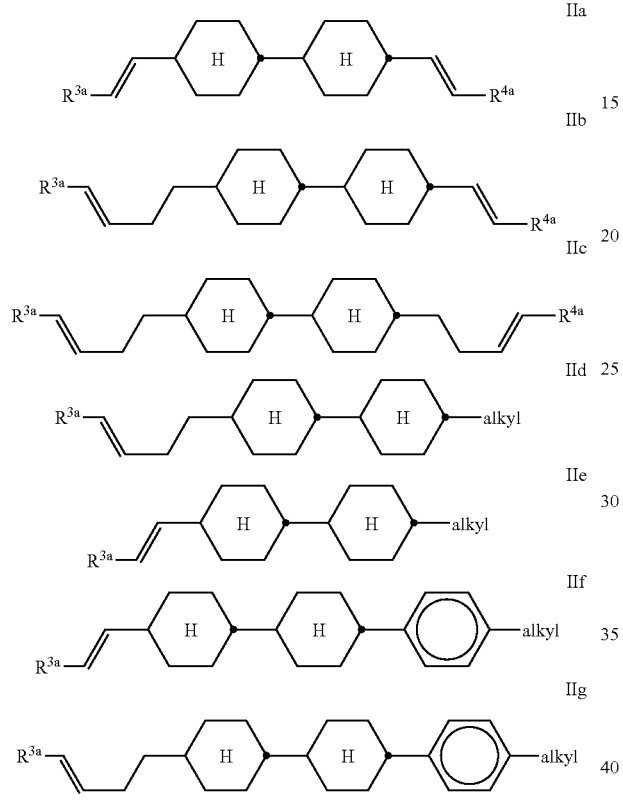

in which $R^{3a}$ and $R^{4a}$ are each, independently of one another, H, methyl, ethyl or n-propyl, and alkyl is $C_{1-6}$-alkyl.

Particular preference is given to compounds of the formulae IIa, IId, IIe and IIg, in particular those of the formulae IIe and IIg in which $R^{3a}$ is H or methyl.

The media according to the invention exhibit very high HR values, low threshold voltages and very good low-temperature stabilities at the same time as high clearing points. In particular, they exhibit significantly reduced rotational viscosity compared with the media from the prior art.

Some preferred embodiments are mentioned below:

a) Medium which additionally comprises one or more compounds of the formula III:

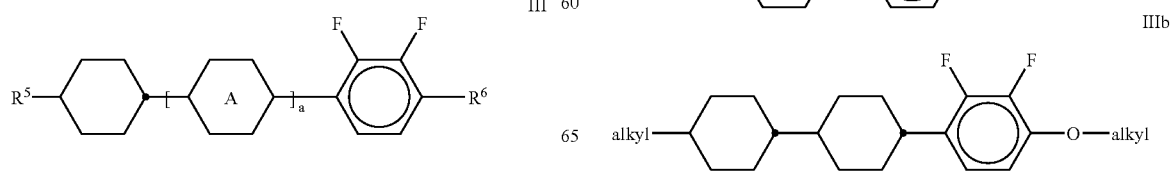

in which $R^5$ and $R^6$ are alkyl having from 1 to 12 carbon atoms, in which, in addition, one or two non-adjacent $CH_2$ groups may be replaced by —O—, —CH=CH—, —CO—, —OCO— or —COO—,

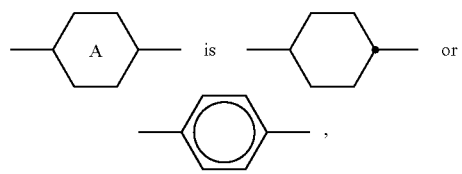

and a is 0 or 1.

b) Medium which additionally comprises one or more compounds of the formula IV:

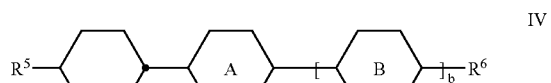

in which $R^5$ and $R^6$, independently of one another, are as defined in the formula III,

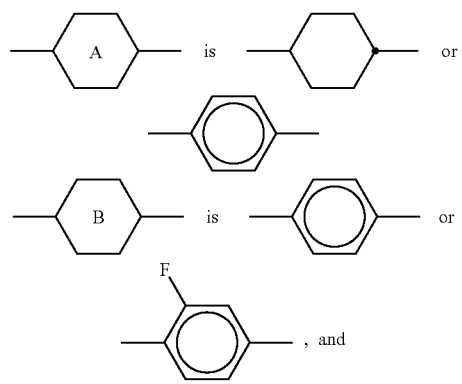

and b is 0 or 1.

c) Medium in which the compounds of the formula III are selected from the following formulae:

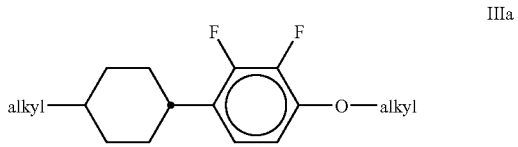

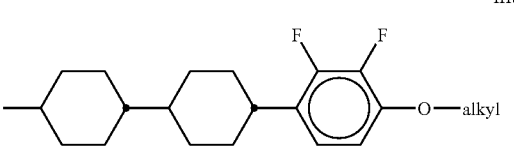

-continued

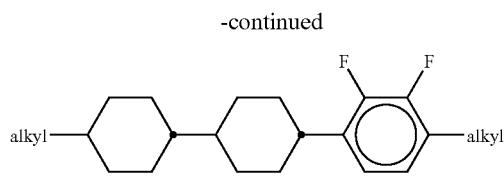

IIIc

IIId

IIIe

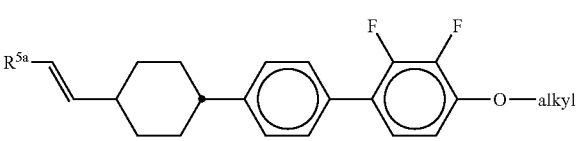

IIIf in which alkyl is $C_{1-6}$-alkyl, and $R^{5a}$ is H, methyl, ethyl or n-propyl, in particular H or methyl. Particular preference is given to compounds of the formulae IIIa, IIIb, IIIc, IIId and IIIf.

d) Medium in which the compounds of the formula IV are selected from the following formulae:

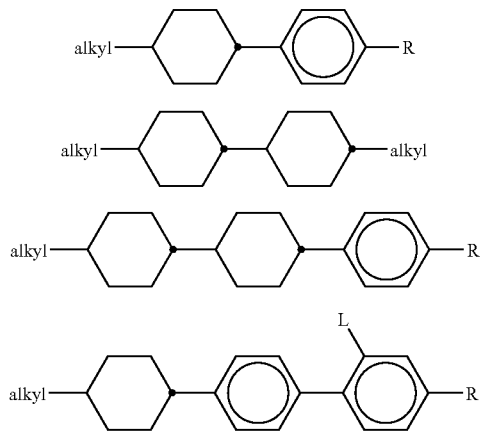

IVa

IVb

IVc

IVd in which alkyl is $C_{1-6}$-alkyl, R is $C_{1-6}$-alkyl or -alkoxy, and L is H or F.

e) Medium which additionally comprises one or more compounds selected from the formulae Va to Vd:

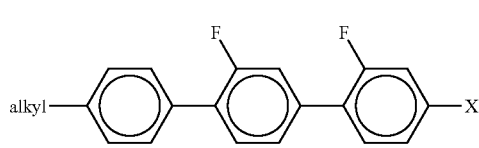

Va

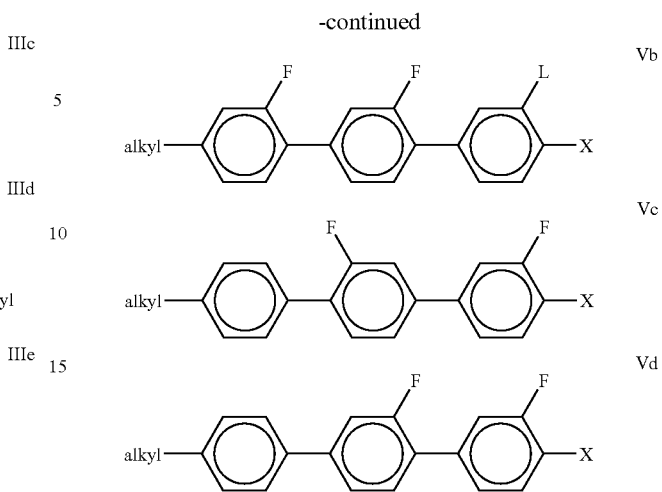

Vb

Vc

Vd in which alkyl is $C_{1-6}$-alkyl, L is H or F, and X is F or Cl. Particular preference is given to compounds of the formula Va in which X is F.

f) Medium which additionally comprises one or more compounds selected from the formulae VIa and VIb:

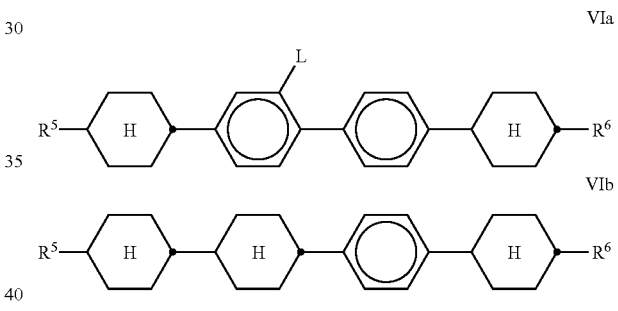

VIa

VIb in which $R^5$ and $R^6$ are as defined in the formula III, and L is H or F. $R^5$ and $R^6$ in these compounds are particularly preferably $C_{1-6}$-alkyl or -alkoxy.

g) Medium which additionally comprises one or more compounds selected from the following formulae:

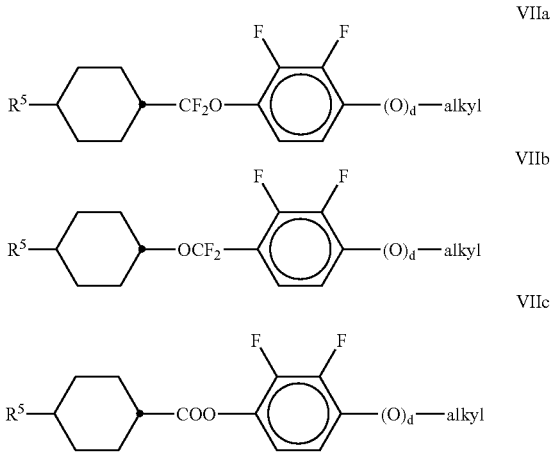

VIIa

VIIb

VIIc

-continued

VIIIa
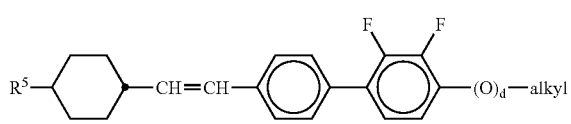

VIIIb
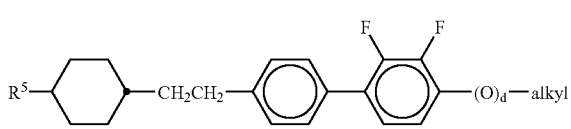

IXa
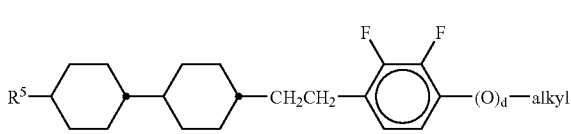

IXb
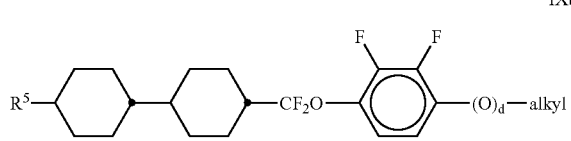

IXc
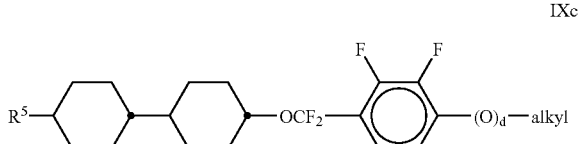

Xa

Xb

XIa
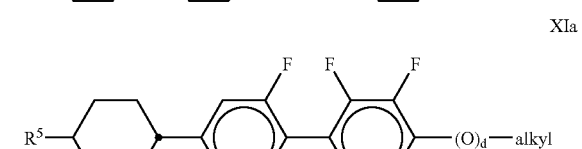

XIb
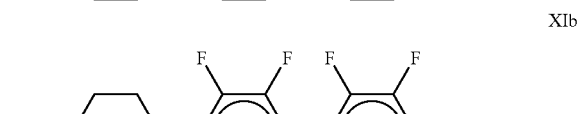

XIc
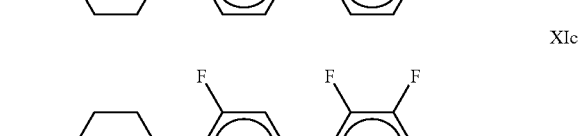

in which $R^5$ and alkyl are as defined above, and d is 0 or 1. $R^5$ in these compounds is particularly preferably $C_{1-6}$-alkyl or -alkoxy, and d is preferably 1. Particular preference is given to compounds of the formulae VIIc, IXb and Xb.

h) Medium which additionally comprises one or more compounds of the formula XII:

XII
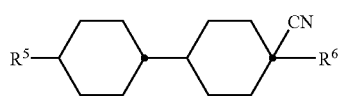

in which $R^5$ and $R^6$ are as defined in the formula III and are preferably alkyl having from 1 to 8 carbon atoms.

i) Medium which additionally comprises one or more compounds of the formula XIII:

XIII
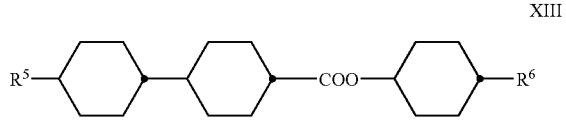

in which $R^5$ and $R^6$ are as defined in the formula III and are preferably alkyl having from 1 to 8 carbon atoms.

k) Medium which additionally comprises one or more compounds selected from the following formulae:

IIIg
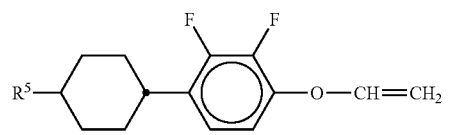

IIIh
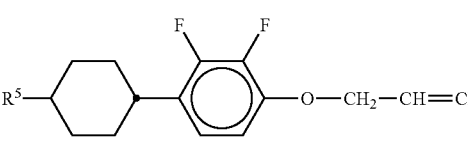

IIIi
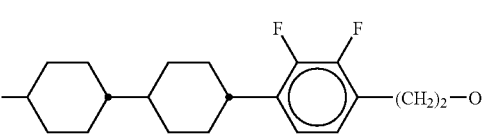

IIIk
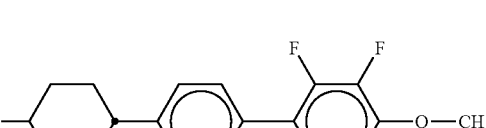

IIIm
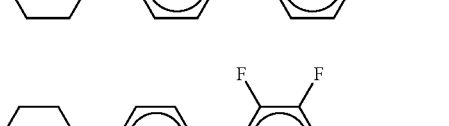

IIIn
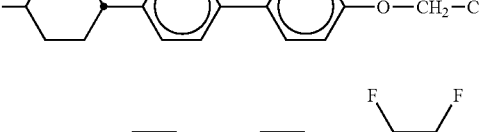

in which $R^5$, $R^{5a}$ and alkyl are as defined above. $R^5$ in these compounds is particularly preferably $C_{1-6}$-alkyl or -alkoxy.

l) Medium which comprises from 1 to 4, preferably 1 or 2, compounds of the formula I and from 1 to 6, preferably 1, 2, 3 or 4, compounds of the formula II.

m) Medium which essentially consists of from 1 to 4 compounds of the formula I, from 1 to 6 compounds of the formula II, from 1 to 10 compounds of the formula III and from 1 to five compounds of the formula IV.

n) Medium in which the proportion of compounds of the formula I in the mixture as a whole is from 5 to 35%, preferably from 9 to 25%.

n) Medium in which the proportion of compounds of the formula II in the mixture as a whole is from 5 to 50%, preferably from 10 to 36%.

o) Medium which essentially consists of
5–35% of one or more compounds of the formula I,
5–50% of one or more compounds of the formula II,
25–70% of one or more compounds of the formula III, and
2–25% of one or more compounds of the formula IV.

p) Medium additionally comprising one or more compounds selected from the following formulae:

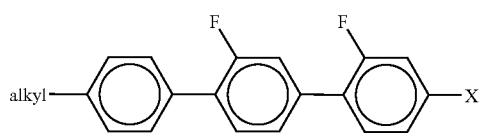
Va

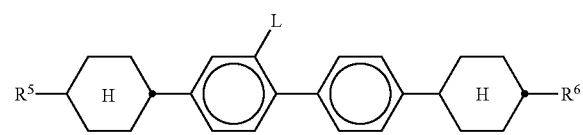
VIa

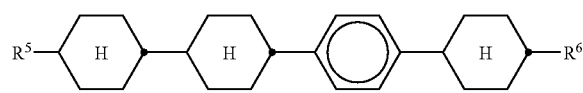
VIb

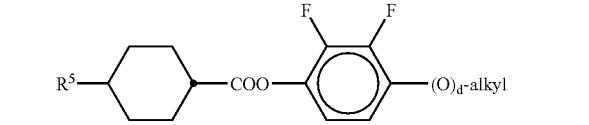
VIIc

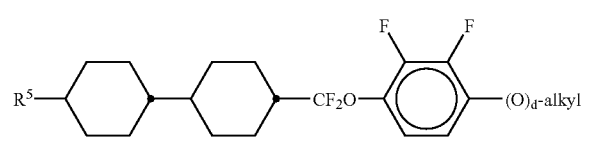
IXb

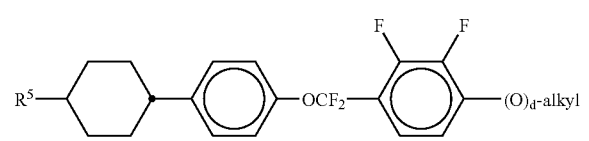
Xb

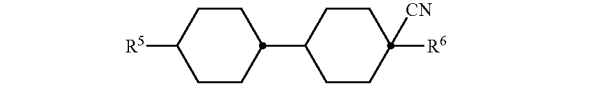
XII

-continued

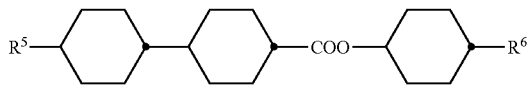
XIII in which $R^5$ and $R^6$ are as defined above, alkyl is $C_{1-6}$-alkyl, L is H or F, X is F or Cl, and d is 0 or 1.

The liquid-crystal mixture preferably has a nematic phase range of at least 80 K, particularly preferably of at least 100 K, and a rotational viscosity of not more than 290 mPa·s, preferably not more than 250 mPa·s.

The liquid-crystal mixture according to the invention has a dielectric anisotropy $\Delta\epsilon$ of from about −0.5 to −7.5, in particular from about −2.8 to −5.5, at 20° C. and 1 kHz.

The birefringence $\Delta n$ in the liquid-crystal mixture is generally below 0.15, in particular between 0.06 and 0.14, particularly preferably between 0.07 and 0.12. The dielectric constant $\epsilon_{\parallel}$ is generally greater than or equal to 3, preferably from 3 to 5.

The dielectrics may also comprise further additives known to the person skilled in the art and described in the literature. For example, 0–15% by weight of pleochroic dyes may be added, furthermore conductive salts, preferably ethyldimethyldodecylammonium 4-hexyloxybenzoate, tetrabutylammonium tetraphenylboranate or complex salts of crown ethers (cf., for example, Haller et al., Mol. Cryst. Liq. Cryst. 24, 249–258 (1973)) may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the formulae I, I, III and IV of the liquid-crystal mixtures according to the invention are either known or their methods of preparation can easily be derived from the prior art by the person skilled in the relevant art since they are based on standard methods described in the literature.

Corresponding compounds of the formulae I and III are described, for example, in EP 0 364 538.

Corresponding compounds of the formula II are described, for example, in EP 0 122 389, DE 26 36 684 and DE 33 21 373.

The term "alkenyl" in formulae II to IV includes straight-chain and branched alkenyl having up to 12, preferably having from 2 to 7, carbon atoms. Straight-chain alkenyl groups are preferred. Further preferred are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Of these groups, particular preference is given to vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups having up to 5 carbon atoms are particularly preferred.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leqq -0.3$. It preferably comprises compounds of the formulae I and III.

The proportion of component A is preferably between 45 and 100% by weight, in particular between 60 and 90% by weight.

For component A, one or more individual compounds which have a value of $\Delta\in$ of $\leqq -0.8$ are preferably selected. This value must be more negative the smaller the proportion of component A in the mixture as a whole.

Component B has pronounced nematogeneity and a rotational viscosity of not greater than 250 mPa·s.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved. A multiplicity of suitable materials is known to the person skilled in the art from the literature. Particular preference is given to compounds of the formula II.

The liquid-crystal mixtures according to the invention preferably comprise from 4 to 25, in particular from 6 to 18, compounds of the formulae I, II, III and IV.

Besides the compounds of the formulae I, II, III and IV, other constituents may also be present, for example in an amount of up to 45% by weight of the mixture as a whole, but preferably up to a maximum of 35% by weight, in particular up to a maximum of 10% by weight.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1.4-biscyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as constituents of liquid-crystal mixtures of this type can be characterised by the formula XV $$R^8\text{-L-G-E-}R^9 \qquad \text{XV}$$

in which

L and E are each a carbocyclic or heterocyclic ring system from the group formed by 1.4-disubstituted benzene and cyclohexane rings, 4.4°-disubstituted biphenyl, phenylcyclohexane and cyclohexylcyclohexane systems, 2.5-disubstituted pyrimidine and 1.3-dioxane rings, 2.6-disubstituted naphthalene, di- and tetrahydronaphthalene, quinazoline and tetrahydroquinazoline, G is —CH=CH— —N(O)=N—
—CH—CQ- —CH=N(O)—
—C≡C— —CH$_2$—CH$_2$—
—CO—O— —CH$_2$—O—
—CO—S— —CH$_2$—S—
—CH=N— —COO-Phe-COO—
or a C—C single bond, Q is halogen, preferably chlorine, or —CN, and $R^8$ and $R^9$ are each alkyl, alkoxy, alkanoyloxy or alkoxycarbonyloxy having up to 18, preferably up to 8, carbon atoms, or one of these radicals is alternatively CN, NC, NO$_2$, CF$_3$, F, Cl or Br.

In most of these compounds, $R^8$ and $R^9$ are different from one another, one of these radicals usually being an alkyl or alkoxy group. Other variants of the proposed substituents are also common. Many such substances or also mixtures thereof are also commercially available. All these substances can be prepared by methods known from the literature.

It goes without saying to the person skilled in the art that the LC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The following examples are intended to explain the invention without limiting it. Above and below, percentages are percent by weight, unless stated otherwise; all temperatures are indicated in degrees Celsius.

The following abbreviations are used:

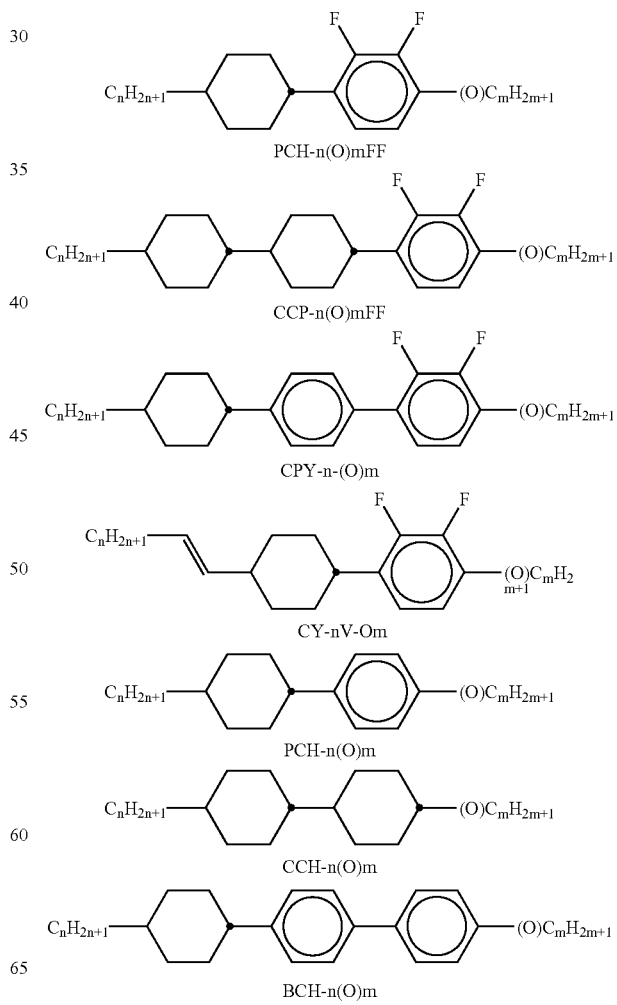

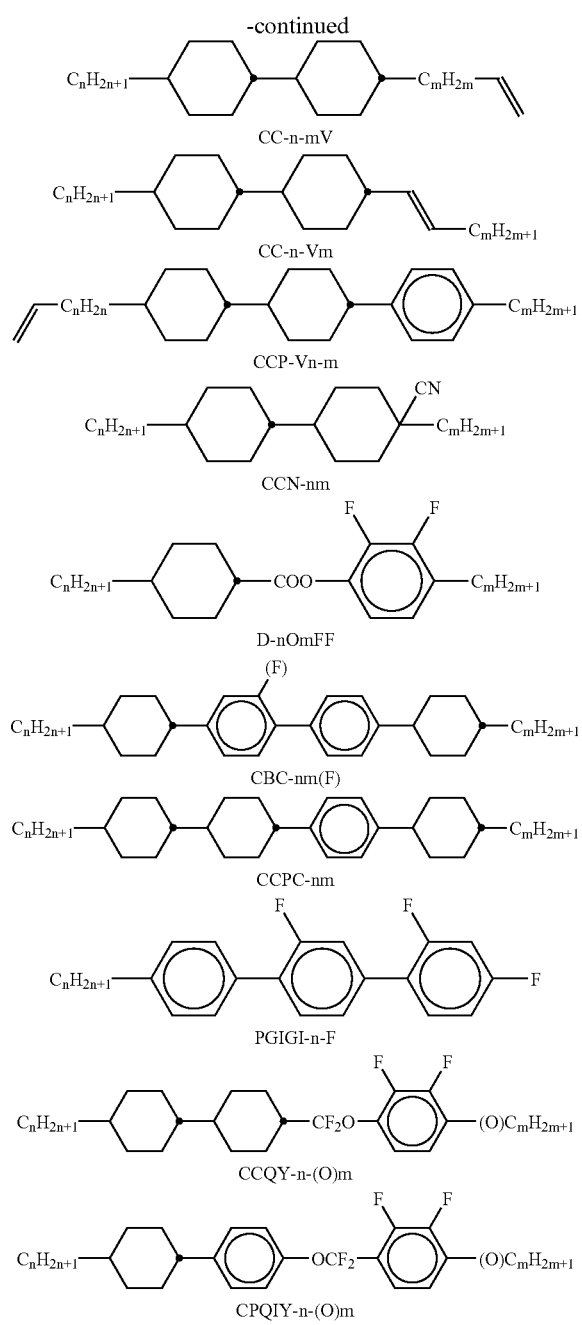

Furthermore:
cl.p. denotes the clearing point [° C.]
Δn denotes the optical anisotropy (birefringence) at 20° C. and 589 nm
Δε denotes the dielectric anisotropy at 20° C. and 1 kHz
$\epsilon_\parallel$ denotes the dielectric constant parallel to the director at 20° C. and 1 kHz
$K_3/K_1$ denotes the ratio of the elastic constants $K_3$ and $K_1$
$\gamma_1$ denotes the rotational viscosity [mPa·s] (at 20° C., unless stated otherwise)
$V_0$ denotes the capacitive threshold voltage [V]
LTS denotes the low-temperature stability of the nematic phase (nem.) in test cells (at T in ° C.)

The display used for measurement of the capacitive threshold voltage has two plane-parallel outer plates at a separation of 20 μm and electrode layers covered with lecithin alignment layers on the insides of the outer plates which cause a homeotropic edge alignment of the liquid-crystal molecules.

EXAMPLE 1

A liquid-crystal display containing

| | | | |
|---|---|---|---|
| PCH-304FF | 8.00% | cl.p. | +70.0 |
| PCH-504FF | 20.00% | Δn | 0.1023 |
| CY-V-O4 | 10.00% | Δε | −4.1 |
| CCP-302FF | 7.00% | $\epsilon_\parallel$ | 3.8 |
| BCH-32 | 7.00% | $K_3/K_1$ | 1.03 |
| CCH-35 | 5.00% | $\gamma_1$ | 137 |
| CC-3-V1 | 8.00% | $V_0$ | 1.90 |
| CC-5-V | 11.00% | LTS | nem. > 1000 h (−30) |
| CPY-2-O2 | 12.00% | | |
| CPY-3-O2 | 12.00% | | |

EXAMPLE 2

A liquid-crystal display containing

| | | | |
|---|---|---|---|
| PCH-304FF | 8.00% | cl.p. | +70.5 |
| PCH-504FF | 20.00% | Δn | 0.1025 |
| CY-V-O4 | 5.00% | Δε | −4.0 |
| CY-V-O2 | 5.00% | $\epsilon_\parallel$ | 3.8 |
| CCP-302FF | 7.00% | $K_3/K_1$ | 1.01 |
| BCH-32 | 7.00% | $\gamma_1$ | 136 |
| CCH-35 | 5.00% | $V_0$ | 1.90 |
| CC-3-V1 | 8.00% | LTS | nem. > 1000 h (−40) |
| CC-5-V | 11.00% | | |
| CPY-2-O2 | 12.00% | | |
| CPY-3-O2 | 12.00% | | |

COMPARATIVE EXAMPLE 1

A liquid-crystal display containing

| | | | |
|---|---|---|---|
| PCH-304FF | 19.00% | cl.p. | +71.0 |
| PCH-504FF | 20.00% | Δn | 0.1020 |
| CCP-302FF | 6.00% | Δε | −3.9 |
| BCH-32 | 7.00% | $\epsilon_\parallel$ | 3.7 |
| CCH-35 | 5.00% | $K_3/K_1$ | 1.02 |
| CC-3-V1 | 8.00% | $\gamma_1$ | 142 |
| CC-5-V | 11.00% | $V_0$ | 1.92 |
| CPY-2-O2 | 12.00% | | |
| CPY-3-O2 | 12.00% | | | has higher rotational viscosity compared with Examples 1 and 2.

EXAMPLE 3

A liquid-crystal display containing

| | | | |
|---|---|---|---|
| PCH-502FF | 6.00% | cl.p. | +70.0 |
| PCH-504FF | 14.00% | Δn | 0.0891 |
| CY-V-O4 | 7.00% | Δε | −3.3 |
| CY-V-O2 | 7.00% | $\epsilon_\parallel$ | 3.6 |
| CCP-302FF | 8.00% | $K_3/K_1$ | 1.04 |

-continued

| | | | |
|---|---|---|---|
| CPY-2-O2 | 9.00% | $\gamma_1$ | 104 |
| CPY-3-O2 | 8.00% | $V_0$ | 2.13 |
| CCP-V2-1 | 8.00% | LTS | nem. > 1000 h (−40) |
| CCH-35 | 5.00% | | |
| CC-3-V1 | 9.00% | | |
| CC-5-V | 19.00% | | |

EXAMPLE 4

A liquid-crystal display containing

| | | | |
|---|---|---|---|
| PCH-502FF | 6.00% | cl.p. | +70.2 |
| PCH-504FF | 10.00% | $\Delta n$ | 0.0906 |
| CY-V-O4 | 9.00% | $\Delta\epsilon$ | −3.4 |
| CY-V-O2 | 9.00% | $\epsilon_\parallel$ | 3.6 |
| CCP-302FF | 9.00% | $K_3/K_1$ | 1.06 |
| CPY-2-O2 | 8.00% | $\gamma_1$ | 104 |
| CPY-3-O2 | 9.00% | $V_0$ | 2.10 |
| CCP-V2-1 | 8.00% | LTS | nem. > 1000 h (−40) |
| CCH-35 | 5.00% | | |
| CC-3-V1 | 9.00% | | |
| CC-5-V | 18.00% | | |

COMPARATIVE EXAMPLE 2

A liquid-crystal display containing

| | | | |
|---|---|---|---|
| PCH-304FF | 16.00% | cl.p. | +71.0 |
| PCH-504FF | 14.00% | $\Delta n$ | 0.0822 |
| CCP-302FF | 12.00% | $\Delta\epsilon$ | −3.8 |
| CCP-502FF | 11.00% | $\epsilon_\parallel$ | 3.6 |
| CCP-21FF | 9.00% | $K_3/K_1$ | 1.08 |
| CCP-31FF | 8.00% | $\gamma_1$ | 135 |
| CCH-34 | 8.00% | $V_0$ | 2.08 |
| CCH-35 | 9.00% | LTS | nem. > 1000 h (−20) |
| PCH-53 | 7.00% | | |
| PCH-301 | 6.00% | | | has higher rotational viscosity and lower $\Delta n$ and worse low-temperature stability compared with Examples 3 and 4.

EXAMPLE 5

A liquid-crystal display containing

| | | | |
|---|---|---|---|
| PCH-304FF | 7.00% | cl.p. | +75.0 |
| PCH-502FF | 10.00% | $\Delta n$ | 0.1201 |
| CY-1V-O2 | 10.00% | $\Delta\epsilon$ | −3.7 |
| CY-1V-O4 | 9.00% | $\gamma_1$ | 148 |
| PGIGI-3-F | 3.00% | | |
| BCH-32 | 9.00% | | |
| CCP-V-1 | 8.00% | | |
| CC-3-V1 | 11.00% | | |
| PCH-53 | 7.00% | | |
| CPY-2-O2 | 13.00% | | |
| CPY-3-O2 | 13.00% | | |

COMPARATIVE EXAMPLE 3

A liquid-crystal display containing

| | | | |
|---|---|---|---|
| PCH-304FF | 20.00% | cl.p. | +74.5 |
| PCH-502FF | 8.00% | $\Delta n$ | 0.1204 |
| PCH-504FF | 8.00% | $\Delta\epsilon$ | −3.7 |
| PGIGI-3-F | 8.00% | $\gamma_1$ | 160 |
| BCH-32 | 8.00% | | |
| CCP-V-1 | 7.00% | | |
| CC-3-V1 | 8.00% | | |
| CC-5-V | 7.00% | | |
| CPY-2-O2 | 14.00% | | |
| CPY-3-O2 | 12.00% | | | has higher rotational viscosity compared with Example 5.

EXAMPLE 6

A liquid-crystal display containing

| | | | |
|---|---|---|---|
| PCH-304FF | 6.00% | cl.p. | +72.0 |
| PCH-502FF | 8.00% | $\Delta n$ | 0.0959 |
| PCH-504FF | 8.00% | $\Delta\epsilon$ | −3.4 |
| CY-1V-O4 | 10.00% | $\gamma_1$ | 109 |
| CCQY-3-O2 | 6.00% | | |
| CCQY-5-O2 | 6.00% | | |
| CPY-V-O2 | 9.00% | | |
| CPY-V-O4 | 9.00% | | |
| BCH-32 | 4.00% | | |
| CC-3-V1 | 10.00% | | |
| CCH-35 | 12.00% | | |
| CC-3-V | 8.00% | | |
| PCH-302 | 4.00% | | |

COMPARATIVE EXAMPLE 4

A liquid-crystal display containing

| | | | |
|---|---|---|---|
| PCH-304FF | 16.00% | cl.p. | +70.5 |
| PCH-502FF | 8.00% | $\Delta n$ | 0.0954 |
| PCH-504FF | 12.00% | $\Delta\epsilon$ | −3.4 |
| CPY-3-O2 | 8.00% | $\gamma_1$ | 122 |
| CCQY-3-O2 | 5.00% | | |
| CCQY-5-O2 | 5.00% | | |
| CPY-2-O2 | 9.00% | | |
| BCH-32 | 8.00% | | |
| CC-3-V1 | 8.00% | | |
| CCH-35 | 5.00% | | |
| CC-5-V | 16.00% | | | has higher rotational viscosity compared with Example 6.

EXAMPLE 7

A liquid-crystal display containing

| | | | |
|---|---|---|---|
| PCH-502FF | 9.00% | cl.p. | +83.0 |
| PCH-504FF | 14.00% | $\Delta n$ | 0.1031 |
| CY-V-O4 | 10.00% | $\Delta\epsilon$ | −4.8 |
| CCP-302FF | 14.00% | $\epsilon_\parallel$ | 3.7 |
| CCP-31FF | 8.00% | $K_3/K_1$ | 1.10 |
| CC-3-2V | 8.00% | $\gamma_1$ | 178 |
| CC-3-V1 | 8.00% | $V_0$ | 1.93 |

-continued

| | | | |
|---|---|---|---|
| CCH-35 | 5.00% | LTS | nem. > 1000 h (−40) |
| CPY-2-O2 | 12.00% | | |
| CPY-3-O2 | 12.00% | | |

COMPARATIVE EXAMPLE 5

A liquid-crystal display containing

| | | | |
|---|---|---|---|
| PCH-304FF | 8.00% | cl.p. | +83.5 |
| PCH-502FF | 8.00% | $\Delta n$ | 0.1022 |
| PCH-504FF | 18.00% | $\Delta\epsilon$ | −4.9 |
| CCP-302FF | 14.00% | $\epsilon_\parallel$ | 3.8 |
| CCP-31FF | 7.00% | $K_3/K_1$ | 1.05 |
| CC-5-V | 8.00% | $\gamma_1$ | 189 |
| CC-3-V1 | 8.00% | $V_0$ | 1.93 |
| CCH-35 | 5.00% | LTS | nem. > 1000 h (−40) |
| CPY-2-O2 | 12.00% | | |
| CPY-3-O2 | 12.00% | | | has higher rotational viscosity compared with Example 7.

EXAMPLE 8

A liquid-crystal display containing

| | | | |
|---|---|---|---|
| PCH-304FF | 10.00% | cl.p. | +106.0 |
| PCH-504FF | 3.00% | $\Delta n$ | 0.1043 |
| CY-1V-O4 | 9.00% | $\Delta\epsilon$ | −4.7 |
| CY-1V-O2 | 9.00% | $\gamma_1$ | 287 |
| CCP-202FF | 5.00% | | |
| CCP-302FF | 9.00% | | |
| CCP-502FF | 9.00% | | |
| CCP-21FF | 7.00% | | |
| CCP-31FF | 8.00% | | |
| CCY-2O-1 | 4.00% | | |
| CCY-4O-1 | 7.00% | | |
| BCH-32 | 3.00% | | |
| CCP-V-1 | 10.00% | | |
| CBC-33F | 4.00% | | |
| CC-3-V1 | 3.00% | | |

COMPARATIVE EXAMPLE 6

A liquid-crystal display containing

| | | | |
|---|---|---|---|
| PCH-304FF | 10.00% | cl.p. | +106.0 |
| PCH-502FF | 7.00% | $\Delta n$ | 0.1007 |
| PCH-504FF | 10.00% | $\Delta\epsilon$ | −4.7 |
| CCP-202FF | 6.00% | $\gamma_1$ | 315 |
| CCP-302FF | 9.00% | | |
| CCP-502FF | 9.00% | | |
| CCP-21FF | 7.00% | | |
| CCP-31FF | 10.00% | | |
| CCY-2O-1 | 9.00% | | |
| CCY-4O-1 | 6.00% | | |
| BCH-32 | 3.00% | | |
| CCP-V-1 | 8.00% | | |
| CBC-33F | 4.00% | | |
| CC-3-V1 | 3.00% | | | has higher rotational viscosity compared with Example 8.

EXAMPLE 9

A liquid-crystal display containing

| | | | |
|---|---|---|---|
| PCH-502FF | 10.00% | cl.p. | +77.0 |
| PCH-504FF | 7.00% | $\Delta n$ | 0.1018 |
| CY-1V-O2 | 7.00% | $\Delta\epsilon$ | −3.9 |
| CY-1V-O4 | 7.00% | $\gamma_1$ | 124 |
| CCP-302FF | 6.00% | | |
| CCP-31FF | 5.00% | | |
| CC-3-V1 | 10.00% | | |
| CC-3-2V | 8.00% | | |
| CC-5-V | 14.00% | | |
| CPY-2-O2 | 12.00% | | |
| CPY-3-O2 | 11.00% | | |
| BCH-32 | 3.00% | | |

COMPARATIVE EXAMPLE 7

A liquid-crystal display containing

| | | | |
|---|---|---|---|
| PCH-304FF | 12.00% | cl.p. | +76.5 |
| PCH-502FF | 7.00% | $\Delta n$ | 0.0990 |
| PCH-504FF | 13.00% | $\Delta\epsilon$ | −4.0 |
| CCP-302FF | 11.00% | $\gamma_1$ | 138 |
| CC-3-V1 | 10.00% | | |
| CC-5-V | 19.00% | | |
| CPY-2-O2 | 12.00% | | |
| CPY-3-O2 | 12.00% | | |
| BCH-32 | 4.00% | | | has higher rotational viscosity compared with Example 9.

EXAMPLE 10

A liquid-crystal display containing

| | | | |
|---|---|---|---|
| PCH-304FF | 5.00% | cl.p. | +74.5 |
| PCH-502FF | 5.00% | $\Delta n$ | 0.1102 |
| PCH-504FF | 6.00% | $\Delta\epsilon$ | −3.2 |
| CY-1V-O2 | 10.00% | $\gamma_1$ | 125 |
| CY-1V-O4 | 9.00% | | |
| BCH-32 | 9.00% | | |
| CCP-V-1 | 10.00% | | |
| CC-5-V | 7.00% | | |
| PCH-53 | 6.00% | | |
| CC-3-V1 | 11.00% | | |
| CPY-2-O2 | 11.00% | | |
| CPY-3-O2 | 11.00% | | |

EXAMPLE 11

A liquid-crystal display containing

| | | | |
|---|---|---|---|
| PCH-502FF | 10.00% | cl.p. | +70.5 |
| PCH-504FF | 8.00% | $\Delta n$ | 0.1096 |
| CY-V-O2 | 9.00% | $\Delta\epsilon$ | −3.3 |
| CY-V-O4 | 9.00% | $\gamma_1$ | 118 |
| BCH-32 | 9.00% | | |
| CCP-V-1 | 11.00% | | |
| CC-5-V | 6.00% | | |

-continued

| | |
|---|---|
| PCH-53 | 2.00% |
| CC-3-V1 | 12.00% |
| CPY-2-O2 | 12.00% |
| CPY-3-O2 | 12.00% |

COMPARATIVE EXAMPLE 8

A liquid-crystal display containing

| | | | |
|---|---|---|---|
| PCH-304FF | 14.00% | cl.p. | +70.0 |
| PCH-502FF | 8.00% | Δn | 0.1106 |
| PCH-504FF | 14.00% | Δε | −3.3 |
| BCH-32 | 9.00% | $\gamma_1$ | 135 |
| CCP-V-1 | 7.00% | | |
| PGIGI-3-F | 3.00% | | |
| CC-5-V | 8.00% | | |
| PCH-53 | 5.00% | | |
| CC-3-V1 | 8.00% | | |
| CPY-2-O2 | 12.00% | | |
| CPY-3-O2 | 12.00% | | | has higher rotational viscosity compared with Examples 10 and 11.

EXAMPLE 12

A liquid-crystal display containing

| | | | |
|---|---|---|---|
| PCH-502FF | 10.00% | cl.p. | +70.0 |
| PCH-504FF | 14.00% | Δn | 0.1015 |
| CY-1V-O2 | 8.00% | Δε | −4.2 |
| CY-1V-O4 | 10.00% | $\gamma_1$ | 172 |
| CPY-2-O2 | 8.00% | | |
| CPY-3-O2 | 8.00% | | |
| CCP-V-1 | 11.00% | | |
| CCH-35 | 4.00% | | |
| CC-3-V1 | 10.00% | | |
| CC-5-V | 3.00% | | |
| CPQIY-3-O4 | 7.00% | | |
| CPQIY-5-O4 | 7.00% | | |

COMPARATIVE EXAMPLE 9

A liquid-crystal display containing

| | | | |
|---|---|---|---|
| PCH-304FF | 17.00% | cl.p. | +70.5 |
| PCH-502FF | 9.00% | Δn | 0.0993 |
| PCH-504FF | 14.00% | Δε | −4.2 |
| CPY-2-O2 | 7.00% | $\gamma_1$ | 187 |
| CPY-3-O2 | 7.00% | | |
| CCP-V-1 | 12.00% | | |
| CCH-35 | 5.00% | | |
| CC-3-V1 | 9.00% | | |
| CPQIY-3-O4 | 10.00% | | |
| CPQIY-5-O4 | 10.00% | | | has higher rotational viscosity compared with Example 12.

What is claimed is:

1. A liquid-crystalline medium comprising:
one or more compounds of formula I

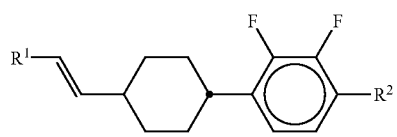

and one or more compounds of the formula II

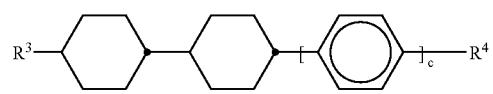

in which
$R^1$ is H or alkyl having from 1 to 5 carbon atoms,
$R^2$ is alkoxy having from 1 to 12 carbon atoms,
$R^3$ is alkenyl having from 2 to 7 carbon atoms,
$R^4$ is alkyl having from 1 to 12 carbon atoms, in which, in addition, one or two non-adjacent CH$_2$ groups may be replaced by —O—, —CH=CH—, —CO—, —OCO— or —COO— in such a way that O atoms are not linked directly to one another, and
c is 0 or 1; and
one or more compounds of the formula III

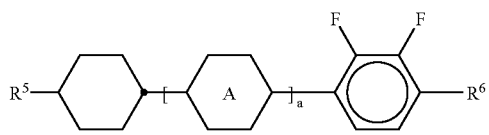

in which
$R^5$ and $R^6$ are alkyl having from 1 to 12 carbon atoms, in which, in addition, one or two non-adjacent CH$_2$ groups may be replaced by —O—, —CH=CH—, —CO—, —OCO— or —COO—,

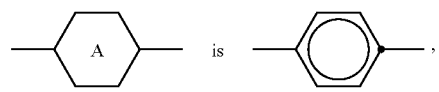

and
a is 1.

2. A medium according to claim 1, wherein said medium, in addition to said one or more compounds of formula III, additionally comprises one or more compounds of formula III′

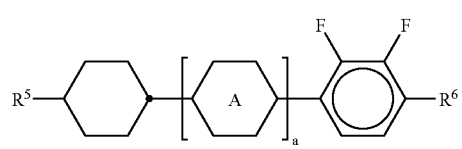

in which
R⁵ and R⁶ are each independently alkyl having from 1 to 12 carbon atoms, in which, in addition, one or two non-adjacent CH₂ groups may each be replaced by —O—, —CH=CH—, —CO—, —OCO— or —COO—,

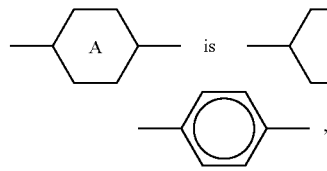

and
a is 0 or 1.

3. A medium according to claim 1, wherein said medium additionally comprises one or more compounds of the formula IV which is different from said compound of formula II

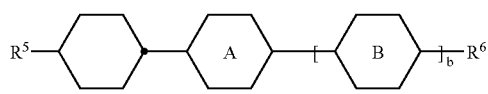  IV in which
R⁵ and R⁶, independently of one another, are each independently alkyl having from 1 to 12 carbon atoms, in which, in addition, one or two non-adjacent CH₂ groups may each be replaced by —O—, —CH=CH—, —CO—, —OCO— or —COO—

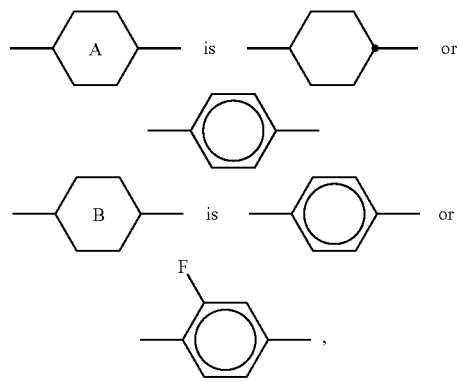

and
b is 0 or 1.

4. A medium according to claim 1, wherein said one or more compounds of formula III are selected from the following formulae:

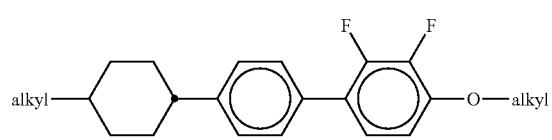  IIId

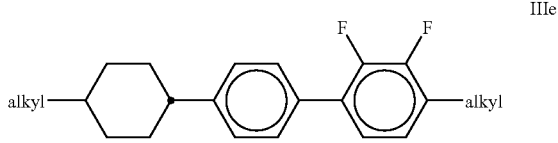  IIIe

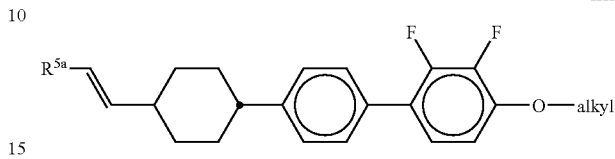  IIIf in which alkyl is $C_{1-6}$-alkyl, and $R^{5a}$ is H, methyl, ethyl or n-propyl.

5. A medium according to claim 3, wherein said one or more compounds of formula IV are selected from the following formulae:

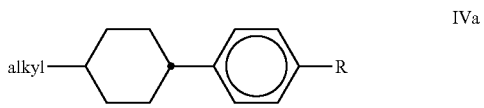  IVa

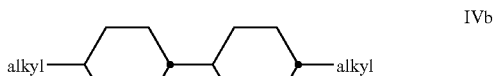  IVb

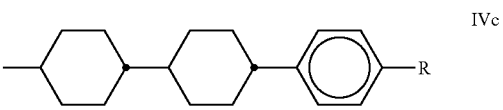  IVc

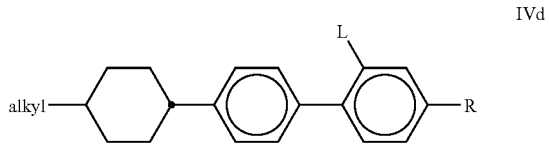  IVd in which alkyl is $C_{1-6}$-alkyl, R is $C_{1-6}$-alkyl or -alkoxy, and L is H or F.

6. A medium according to claim 1, further comprising one or more compounds selected from the following formulae:

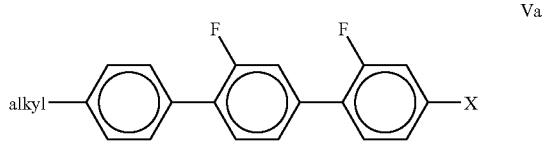  Va

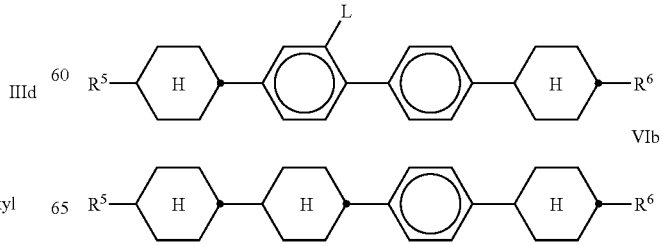  VIa

VIb

-continued

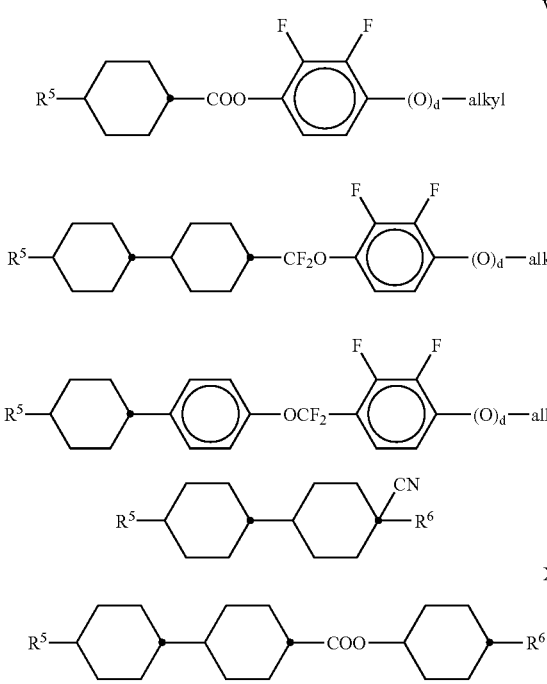

in which
R⁵ and R⁶ are each independently alkyl having from 1 to 12 carbon atoms, in which, in addition, one or two non-adjacent CH₂ groups may each be replaced by —O—, —CH=CH—, —CO—, —OCO— or —COO—,
alkyl is $C_{1-6}$-alkyl,
L is H or F,
X is F or Cl, and
d is 0 or 1.

7. A medium according to claim 1, wherein the proportion of compounds of formula I in the mixture as a whole is from 5 to 35%.

8. A medium according to claim 1, wherein the proportion of compounds of the formula II in the mixture as a whole is from 5 to 50%.

9. An electro-optical display having active-matrix addressing, wherein said display contains, as a dielectric, a liquid-crystalline medium according to claim 1.

10. An electro-optical display according to claim 9, wherein said display is based on the ECB, VA, DAP, CSH, IPS, ASM or PALC effect.

11. A medium according to claim 4, wherein $R^{5a}$ is H or methyl.

12. A medium according to claim 7, wherein the proportion of compounds of formula II in the mixture as a whole is from 5 to 50%.

13. A medium according to claim 7, wherein the proportion of compounds of formula I in the mixture as a whole is from 9 to 25%.

14. A medium according to claim 8, wherein the proportion of compounds of formula II in the mixture as a whole is from 10 to 36%.

15. A medium according to claim 13, wherein the proportion of compounds of formula II in the mixture as a whole is from 10 to 36%.

16. A medium according to claim 2, wherein said medium additionally comprises one or more compounds of formula IV which is different from said compound of formula II

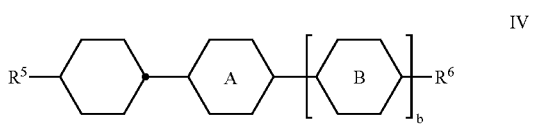

in which
R⁵ and R⁶, independently of one another, are each independently alkyl having from 1 to 12 carbon atoms, in which, in addition, one or two non-adjacent CH₂ groups may each be replaced by —O—, —CH=CH—, —CO—, —OCO— or —COO—,

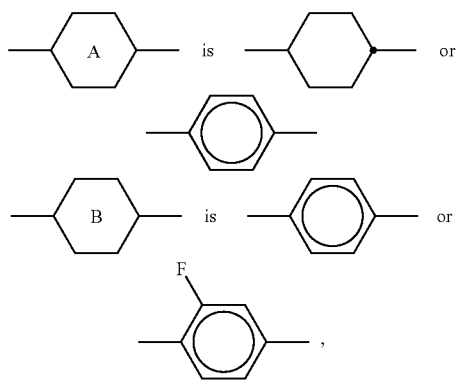

and
b is 0 or 1.

17. A medium according to claim 3, wherein said medium essentially consists of from 1 to 4 compounds of formula I, from 1 to 6 compounds of formula II, from 1 to 10 compounds of formula III and from 1 to five compounds of formula IV.

18. A medium according to claim 3, wherein said medium essentially consists of:
5–35% of one or more compounds of formula I,
5–50% of one or more compounds of formula II,
25–70% of one or more compounds of formula III, and
2–25% of one or more compounds of formula IV.

19. A medium according to claim 1, wherein said one or more compounds of formula III are selected from the following formulae:

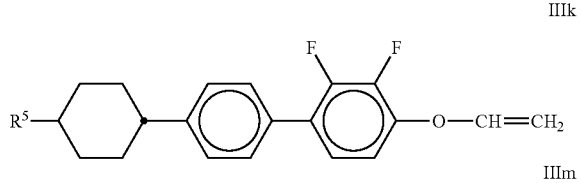

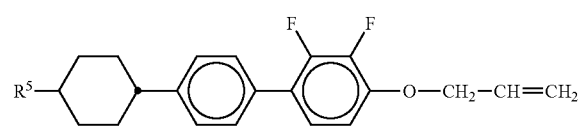

-continued

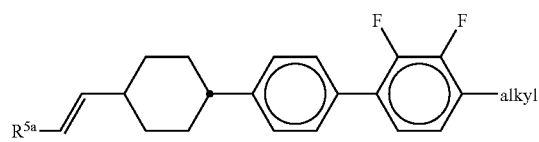

IIIn in which

R⁵ is alkyl having from 1 to 12 carbon atoms, in which, in addition, one or two non-adjacent CH₂ groups may be replaced by —O—, —CH=CH—, —CO—, —OCO— or —COO—, R$^{5a}$ is H, methyl, ethyl or n-propyl, and alkyl is $C_{1-6}$-alkyl.

20. A medium according to claim 1, wherein said medium has a nematic phase range of at least 100 K, and a rotational viscosity of not more than not more than 250 mPa·s.

21. A medium according to claim 1, wherein said medium has a dielectric anisotropy Δ∈ of −2.8 to −5.5 at 20° C. and 1 kHz.

22. A medium according to claim 1, wherein said medium has a birefringence Δn between 0.06 and 0.14, and a dielectric constant ∈$_∥$ from 3 to 5.

* * * * *